United States Patent
Correa et al.

(10) Patent No.: US 9,548,510 B2
(45) Date of Patent: Jan. 17, 2017

(54) METHOD OF MAKING FUEL CELL COMPONENT USING ADHESIVE TAPE TO MAINTAIN POSITIONING OF LOADING MATERIAL PARTICLES

(71) Applicant: FUELCELL ENERGY, INC., Danbury, CT (US)

(72) Inventors: Salvador E. Correa, West Simsbury, CT (US); Thomas M. Lucas, Pleasant Valley, CT (US); Lawrence J. Novacco, Brookfield, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 52 days.

(21) Appl. No.: 14/327,146

(22) Filed: Jul. 9, 2014

(65) Prior Publication Data

US 2014/0356752 A1 Dec. 4, 2014

Related U.S. Application Data

(62) Division of application No. 13/424,028, filed on Mar. 19, 2012, now Pat. No. 8,802,332, which is a division (Continued)

(51) Int. Cl.
| | |
|---|---|
| H01M 8/06 | (2016.01) |
| H01M 8/24 | (2016.01) |
| B01J 8/00 | (2006.01) |
| H01M 8/02 | (2016.01) |
| H01M 8/14 | (2006.01) |

(52) U.S. Cl.
CPC ............. *H01M 8/2485* (2013.01); *B01J 8/003* (2013.01); *H01M 8/0247* (2013.01); *H01M 8/0254* (2013.01); *H01M 8/0637* (2013.01); *B01J 2208/00752* (2013.01); *B01J 2208/00769* (2013.01); *H01M 8/0297* (2013.01); *H01M 8/145* (2013.01); *Y02E 60/50* (2013.01); (Continued)

(58) Field of Classification Search
None
See application file for complete search history.

(56) References Cited

U.S. PATENT DOCUMENTS

| | | | |
|---|---|---|---|
| 5,034,288 A | 7/1991 | Bossel | |
| 5,288,562 A | 2/1994 | Taniguchi et al. | |

(Continued)

FOREIGN PATENT DOCUMENTS

| | | |
|---|---|---|
| EP | 0231576 A1 | 8/1987 |
| EP | 0361383 A1 | 4/1990 |

(Continued)

OTHER PUBLICATIONS

Communication pursuant to Article 94(3) EP received in EP Appl. No. 08 747 841.8-1373 (4 pages).

*Primary Examiner* — Ula C Ruddock
*Assistant Examiner* — Tony Chuo
(74) *Attorney, Agent, or Firm* — Foley & Lardner LLP

(57) ABSTRACT

A method of fabricating a fuel cell component for use with or as part of a fuel cell in a fuel cell stack, the method comprising: providing a fuel cell component, providing a deposition assembly for depositing loading material particles onto the fuel cell component, and actuating the deposition assembly to cause the deposition assembly to deposit said loading material particles onto said fuel cell component.

14 Claims, 12 Drawing Sheets

Related U.S. Application Data of application No. 11/746,911, filed on May 10, 2007, now Pat. No. 8,137,741.

(52) U.S. Cl.
CPC .......... *Y02P 70/56* (2015.11); *Y10T 29/49002* (2015.01); *Y10T 29/54* (2015.01); *Y10T 156/10* (2015.01)

(56) References Cited

U.S. PATENT DOCUMENTS

| | | | |
|---|---|---|---|
| 5,604,174 A | 2/1997 | Friedman et al. | |
| 6,200,696 B1 * | 3/2001 | Farooque | H01M 8/0625 422/211 |
| 6,383,677 B1 | 5/2002 | Allen | |
| 2004/0157104 A1 | 8/2004 | Huang et al. | |

FOREIGN PATENT DOCUMENTS

| | | | |
|---|---|---|---|
| GB | 1361208 | 7/1974 | |
| GB | 2296124 | 6/1996 | |
| JP | H03291855 A | 12/1991 | |
| JP | 06-196184 * | 7/1994 | .............. H01M 8/02 |
| JP | H06-196184 | 7/1994 | |
| JP | H06196184 A | 7/1994 | |
| JP | H08236127 A | 9/1996 | |
| JP | H1092447 A | 4/1998 | |
| WO | 9516287 A1 | 6/1995 | |
| WO | WO-2008/141071 A1 | 11/2008 | |

* cited by examiner

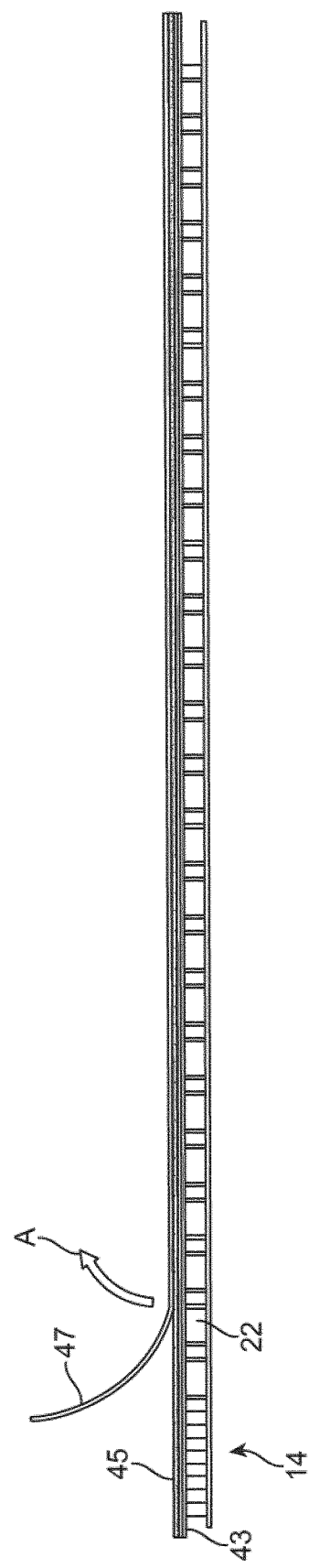

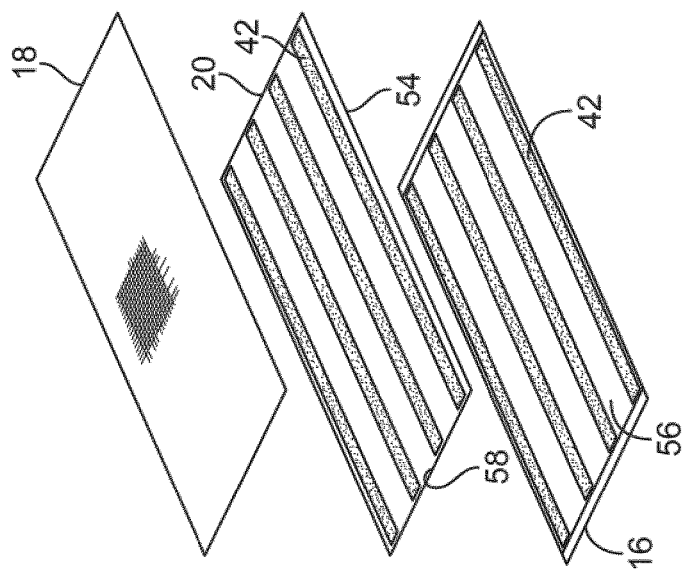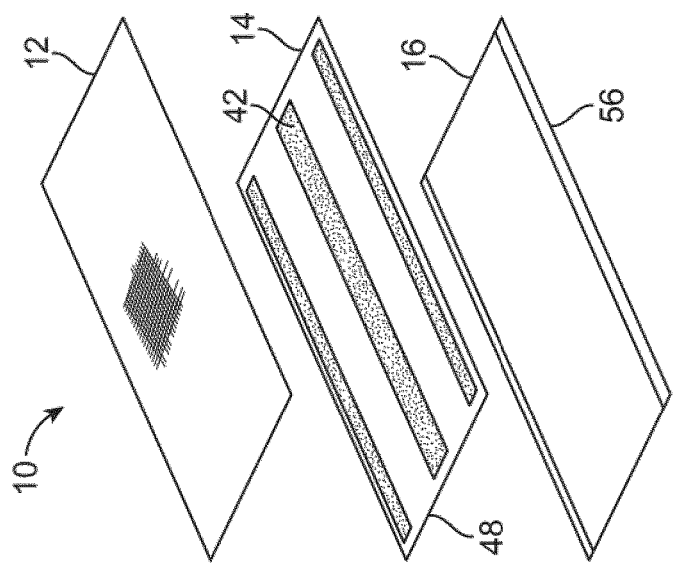
FIG. 6

METHOD OF MAKING FUEL CELL COMPONENT USING ADHESIVE TAPE TO MAINTAIN POSITIONING OF LOADING MATERIAL PARTICLES

CROSS-REFERENCE TO RELATED APPLICATION

This application is a divisional of application Ser. No. 13/424,028, filed on Mar. 19, 2012, which is a divisional of Ser. No. 11/746,911, filed May 10, 2007 and now U.S. Pat. No. 8,137,741, the entire disclosures of which are hereby incorporated by reference.

BACKGROUND OF THE INVENTION

This invention relates to fuel cells and, in particular, to fuel cell assemblies and components having loaded and retained catalyst therein and to apparatus and methods for performing such loading and retaining.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. In order to produce a useful power level, a number of individual fuel cells are stacked in series with an electrically conductive separator plate between each cell.

In internally reforming fuel cells, a reforming catalyst is placed within the fuel cell stack to allow direct use of hydrocarbon fuels such as methane, coal gas, etc. without the need for expensive and complex reforming equipment. In a reforming reaction, fuel cell produced water and heat are used by the reforming reaction, and the hydrocarbon fuel is internally reformed to produce hydrogen for fuel cell use. Thus, the necessary hydrogen fuel is produced by the reforming reaction, and since the reaction is endothermic, it can also be used advantageously to help cool the fuel cell stack.

Two different types of internal reforming have been developed for fuel cell assemblies. One type of internal reforming is indirect internal reforming, which is accomplished by placing the reforming catalyst in an isolated chamber within the stack and routing the reformed gas from this chamber into the anode compartment of the fuel cell. A second type of internal reforming is direct internal reforming. This type of internal reforming is accomplished by placing the reforming catalyst within the active anode compartment or fuel flow field, which provides the hydrogen produced by the reforming reaction directly to the anode.

A typical fuel cell anode compartment comprises a separator or bipolar plate for isolating fuel from the oxidant stream of the neighboring fuel cell, an anode electrode for providing electrochemical reaction sites, and an anode current collector often provided as a corrugated plate, for conducting electronic current from the anode electrode. The anode current collector is in contact with the anode electrode and also defines flow channels for the fuel gas. The reforming catalyst is placed in these flow channels to provide the direct internal reforming.

The reforming catalyst is usually available as compacted or solid particles having various solid shapes or forms such as tablet, pellet, rod, ring or sphere. However, due to the dimensions of the catalyst particles, difficulties have been encountered in trying to load the particles in the current collector channels. One difficulty is that the relatively small size of the catalyst particles makes them difficult to handle during assembly. This, in turn, makes the process of catalyst loading inefficient, and thus, unduly costly.

A second difficulty sometimes arises in achieving and maintaining a desired loading pattern of the catalyst because of the tendency of the catalyst particles to shift during the loading process and the fuel cell assembly process. The importance of the desired loading pattern stems in part from the desire to maintain a required heating profile in the fuel cell stack. This profile helps promote efficient and long term operation of the stack.

A manner of improving the efficiency and reliability of loading the catalyst particles in fuel cell components is thus always desirable. Additionally, the ability to better retain the loaded catalyst while concurrently enabling maximum operational efficiency is also a goal in the manufacturing process.

SUMMARY OF THE INVENTION

In accordance with the embodiment(s) of the invention disclosed hereinafter, an apparatus and associated method are provided in a system for accurately loading catalyst particles into fuel cell components. An apparatus and associated method are also provided in a system which uses a fixing agent for retaining the loaded catalyst and, if desired, other fuel cell components.

A particular system in use of the apparatus and method comprises a support for supporting a fuel cell component adapted to receive catalyst particles and a deposition assembly adapted to load the catalyst particles onto the fuel cell component. The system further optionally comprises a mechanism for applying a fixing agent to the fuel cell component and the loaded catalyst particles for retention of the catalyst particles.

In a further aspect of the invention, the fixing agent applied to the fuel cell component is further adapted to permit the fuel cell component to be held to another fuel component. It is also contemplated that a like fixing agent be used with additional fuel cell components so that these additional components, the another component and the catalyst loaded component, with the aid of the fixing agent, are held together so as to in facilitate handling and stacking of the components in the formation of a fuel cell stack.

In the embodiments disclosed, the fuel cell component is a corrugated anode current collector, the other component is a separator plate and the additional components are an anode, a cathode and a cathode current collector and the fixing agent is a double-sided adhesive medium.

It is contemplated that the aforementioned fixing agent comprises, optionally, a double-sided acrylic adhesive tape of the type currently manufactured by the 3M Company.

In one illustrative form of the invention, the deposition assembly includes individual deposition mechanisms each adapted to urge a catalyst particle delivered to the deposition mechanism onto the fuel cell component. The deposition mechanisms are arranged in a row across the width of the fuel cell component and are caused to be selectively operated based on the sensed position of the fuel cell component. As the fuel cell component is indexed, the sensed position causes an actuator assembly to selectively operate the deposition mechanisms and this continues until the fuel cell component is loaded. In this embodiment, each deposition mechanism optionally comprises a hydraulic or pneumatic cylinder or an electric actuator with a plunger and a gate assembly. The gate assembly holds the catalyst particle and prevents it from being delivered to the fuel cell component. Upon operation of the actuator assembly, the gate assembly is released and the hydraulic or pneumatic cylinder or electric actuator moves the plunger to urge the catalyst particle onto the fuel cell component.

In another illustrative embodiment, the deposition assembly includes a mask gate assembly having overlying first and second plates. The first plate has openings corresponding to the predetermined areas on the fuel cell component to receive catalyst and the second plate has openings corresponding to all the areas of the fuel cell component able to receive catalyst particles. The first plate is disposed over the fuel cell component and the second plate is disposed over the first plate so that its openings are misaligned with the openings of the first plate. The second plate is then loaded with catalyst particles which come to reside in the plate openings and are blocked from entering the openings in the first plate due to the misalignment.

The second plate is then shifted by the actuator assembly so that its openings then align with those in the first plate. Vibration motion being applied to the plates causes the catalysts in the aligned openings of the two plates to pass from the openings in the second plate through the aligned openings of the first plate and from these openings to the corresponding areas of the fuel cell component. The fuel component is thereby loaded with a predetermined pattern of catalyst defined by the first plate.

BRIEF DESCRIPTION OF THE DRAWINGS

The above and other features and aspects of the present invention will become more apparent upon reading the following detailed description in conjunction with the accompanying drawings, in which:

FIG. 5 shows, demonstrably, the process of using a fixing agent in adhering a current collector loaded with the catalyst particles to other components in the forming of a fuel cell assembly.

FIG. 6 shows an exploded view of the components of a fuel cell assembly joined together with a fixing agent.

DETAILED DESCRIPTION

Figure 1:
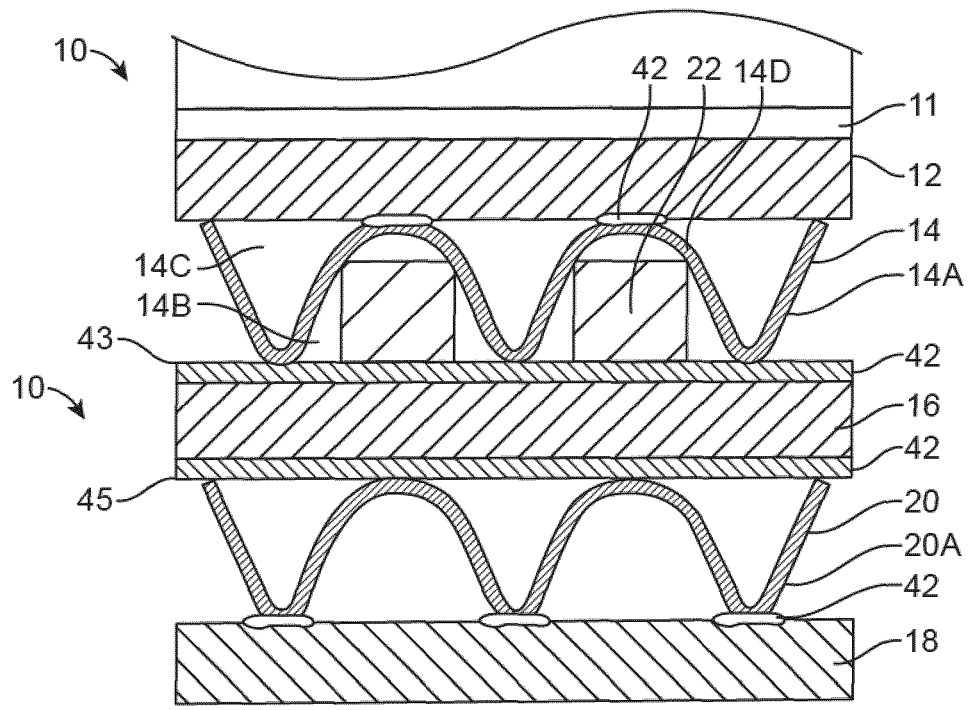
FIG. 1 shows a molten carbonate fuel cell with a first reforming catalyst member.
Figure 1A:
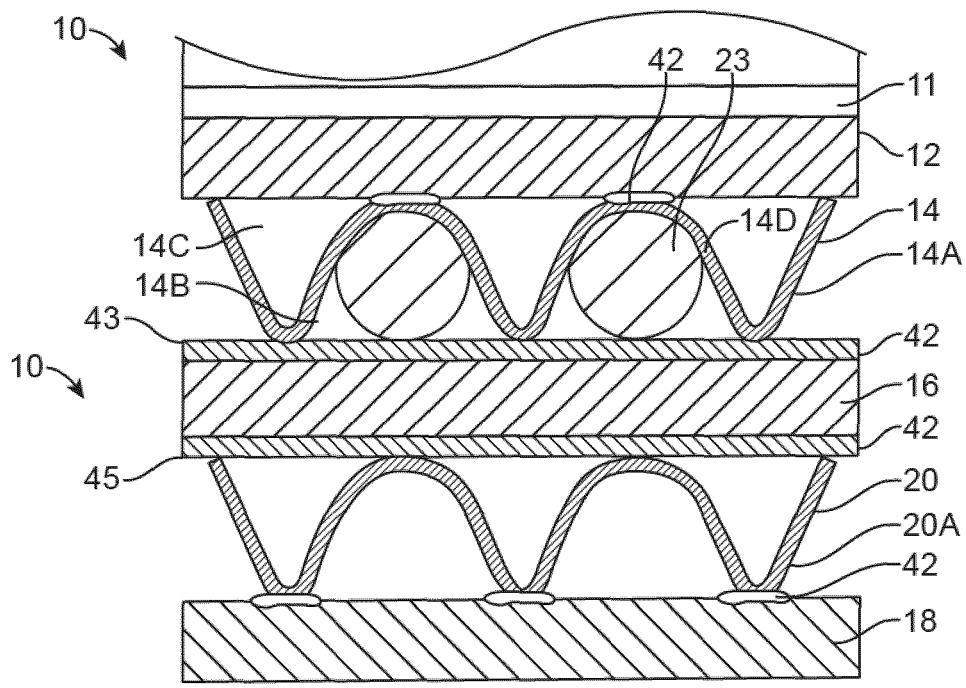
FIG. 1A shows a molten carbonate fuel cell with a second reforming catalyst member.

Referring to FIGS. 1, 1A and 6, there is shown a fuel cell stack formed by stacking assemblies 10 one on the other with an electrolyte matrix 11 between adjacent assemblies. The electrolyte matrix 11 is adapted hold an electrolyte such as, for example, a carbonate electrolyte. Each assembly 10 comprises an anode electrode 12 and an associated current collector 14, shown as having corrugations 14A. Each assembly 10 further comprises a bipolar separator 16 which separates the anode electrode 12 and current collector 14 from a cathode electrode 18 and its associated current collector 20, also shown as having corrugations 20A. The corrugations 14A of the anode current collector 14 define with the bipolar separator plate 16 and the anode electrode 12, first and second sets of fuel gas channels 14B and 14C. The anode current collector is further loaded with a plurality of catalyst particles 22 situated in the channels 14B and, in particular, in the areas 14D between and engaged by the legs of adjacent corrugations 14A. The catalyst particles 22 can take on various configurations. In FIG. 1, the catalyst particles 22 are shown as having a square cross-section and in FIG. 2 as having a circular cross-section. Other cross-section shapes such as hexagonal and "star" to improve the available surface area can also be used for the catalyst particles 22.

The catalyst particles 22 promote further reforming of the hydrocarbons in the fuel gas in the channels 14B to increase the hydrogen content of the gas. A portion of the further reformed gas in the channels 14B then passes into the channels 14C via openings in or discontinuities in the corrugations 14A as the gas continues traveling along the channels 14B. The further reformed gas thus combines with the fuel gas introduced directly into the channels 14C and the combined gas is thereby made available to participate in the electrochemical conversion reaction at the anode 12.

In order that the above-mentioned reforming reaction takes place efficiently in the fuel gas channels 14B and also in order to promote a desired heating profile for the fuel cell stack, it is desirable to load the anode current collector 14 with the catalyst particles 22 in a certain pattern and to retain that pattern. Accordingly, the following provides an advantageous way in which to achieve both the loading and retaining of the catalyst particles in a desired pattern.

Figure 2:
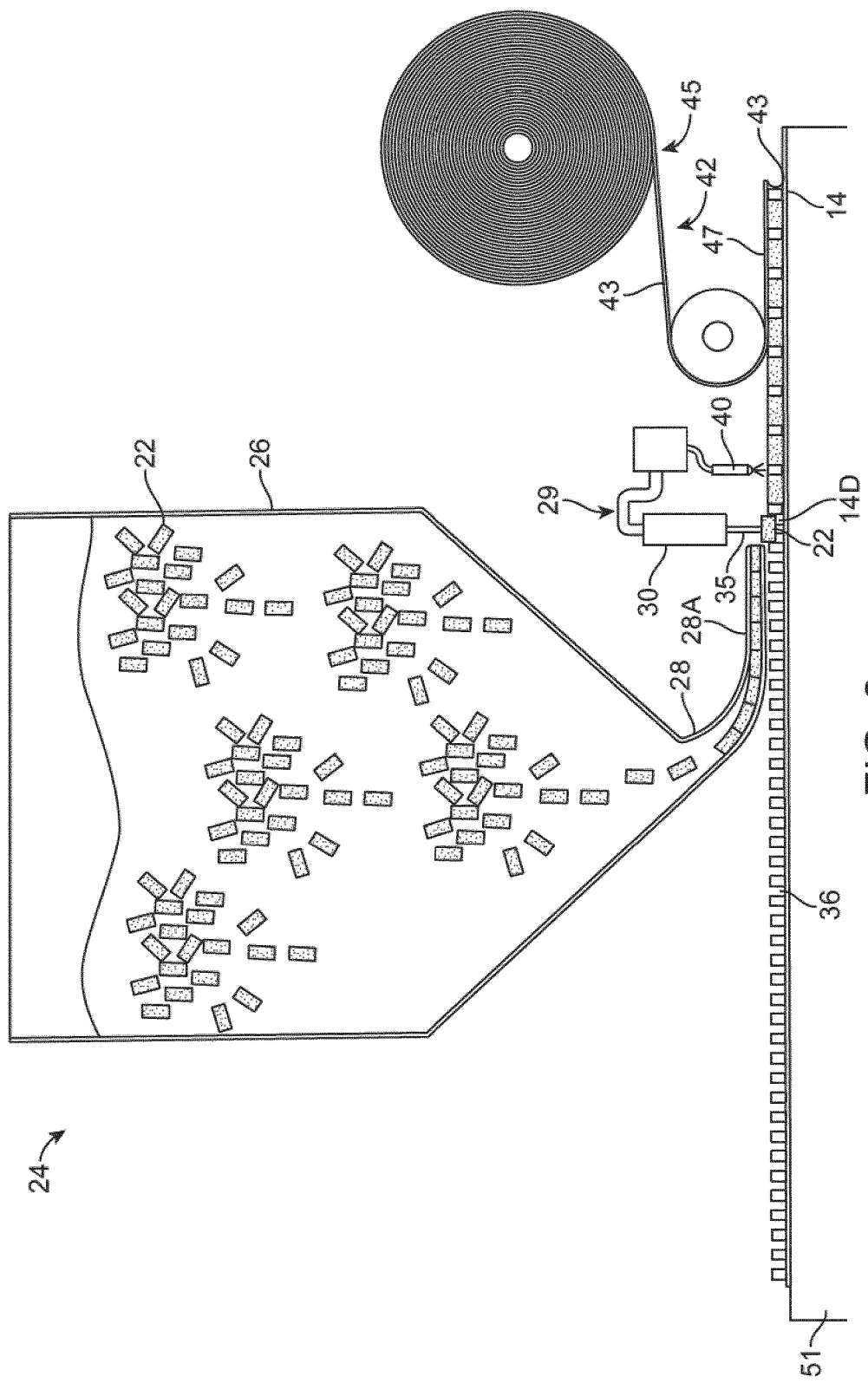
FIG. 2 shows a system for the placement of catalyst particles in the form of pellets onto a current collector associated with the anode electrode of a fuel cell assembly.
Figure 3:
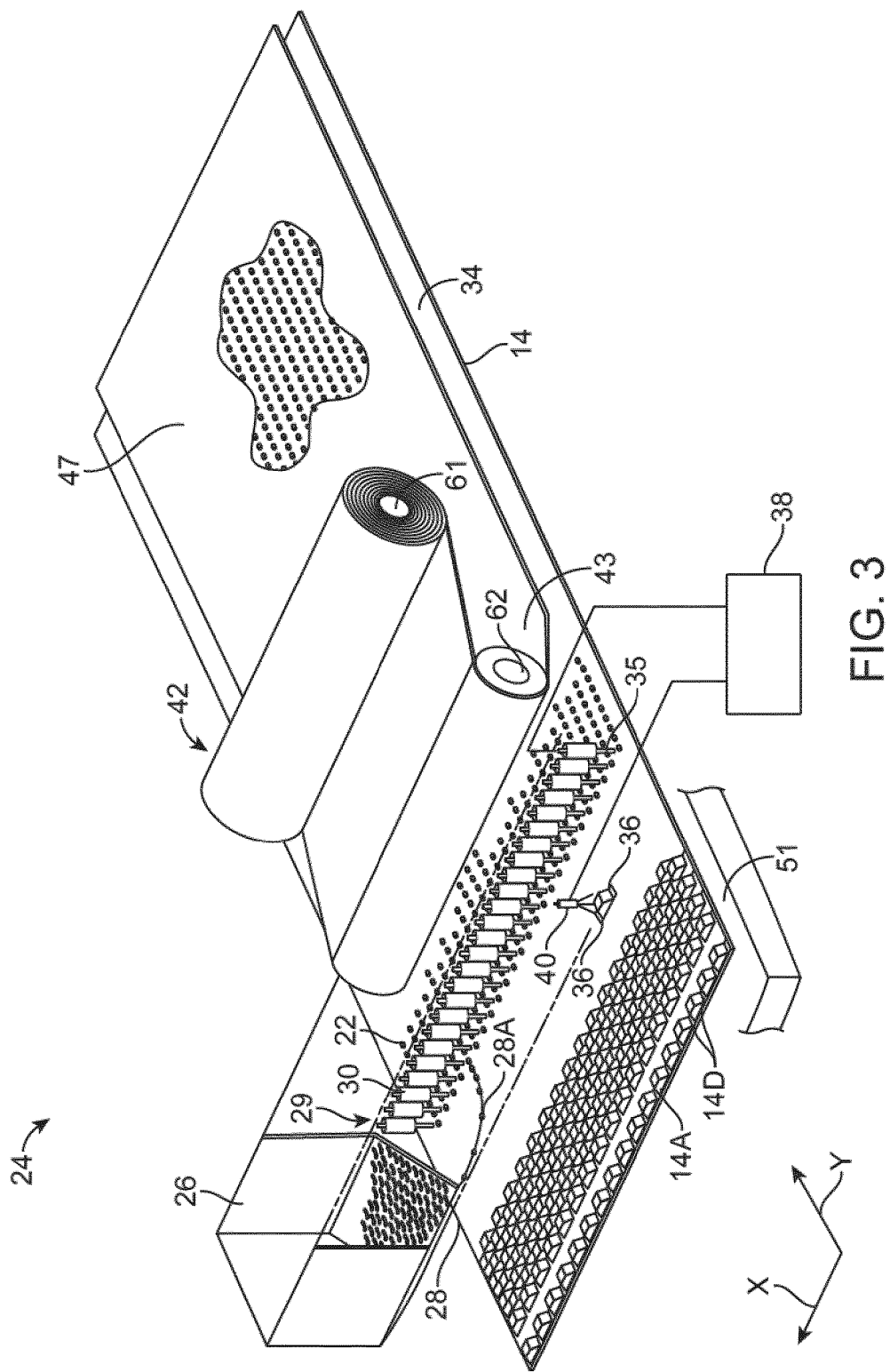
FIG. 3 shows the system of FIG. 2 and subsequent placement of a fixing agent to retain positioning of the loaded catalyst particles relative to the current collector

Referring to FIGS. 2-3, there is shown schematically a system 24 for the loading and retaining of the catalyst particles 22 on the anode current collector 14. The catalyst particles 22, optionally provided in the form of pellets as shown in FIG. 2, are fed from a hopper 26 situated in the vicinity of the current collector 14. The current collector 14 rests on an X-Y movable support or table 51 capable of moving in the X and Y directions. Looking at FIGS. 2 and 3, the hopper 26 is provided with a hopper feed 28 containing a plurality of feed channels 28A arranged in a row so as to span the width (X direction) of the current collector 14. The feed channels 28A lead to a deposition assembly 29 comprised of a row or line of deposition mechanisms 30 also situated to span the width of the current collector 14.

Each of the deposition mechanisms 30 is fed by one of the feed channels 28A and is further aligned with one of the areas 14D between adjacent legs of the corrugations 14A spanning the width of the current collector. By selecting the number of deposition mechanisms 30 to be equal to the number of spaces 14D, each space 14D across the width of the collector plate 14 is able to be fed a catalyst particle 22 by its respective deposition mechanism. Moreover, as shown in FIG. 3 and as above-mentioned, the corrugations 14A are discontinuous in the length direction (Y direction) of the current collector so that they form a plurality of spaced rows 36. Accordingly by bringing each row 36 of corrugations in line with the row of deposition mechanisms 30, the spaces 14D in each row are able to be fed catalyst particles 22 by the associated deposition mechanisms 30.

More particularly, the hopper 26, as a result of vibratory motion imparted thereto, delivers a catalyst particle 22 to each of the feed channels 28A of the hopper feed 28. Each feed channel, in turn, brings a catalyst particle 22 to its respective deposition mechanism 30. In the case shown, as can be seen in more detail in FIGS. 3A-3C, each deposition mechanism 30 defines a chamber 30A in which the fed catalyst particle 22 settles and is held by a gate assembly shown optionally as a spring loaded ball assembly 30B. Other forms of the gate assembly might be an actuator or cylinder assembly. Above the gate assembly, the deposition mechanism 30 includes a hydraulic or pneumatic cylinder or electric actuator 30C equipped with a plunger 35 which contacts the catalyst particle.

Figure 3C:
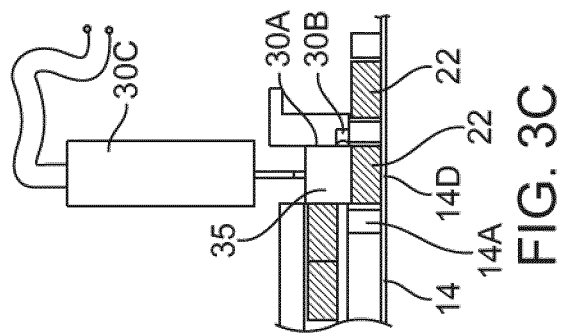
FIGS. 3A-3C show the details of the deposition mechanisms of the system of FIGS. 2 and 3 and the sequence of operation of these mechanisms.
Figure 3B:
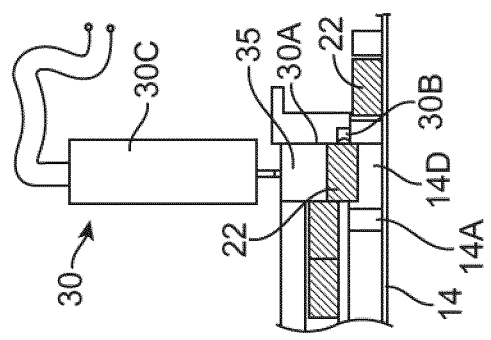
Figure 3A:
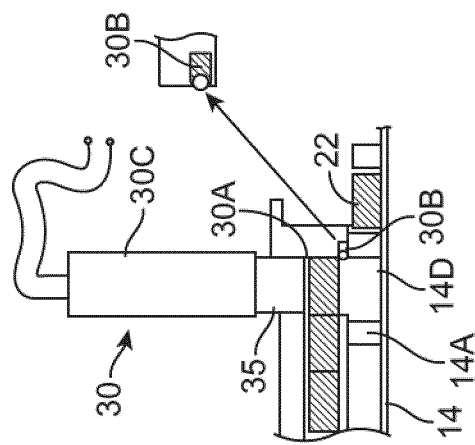

Actuation of a deposition mechanism 30 then results in the sequence of operations in FIGS. 3A-3C. The assembly 30B is first retracted allowing the passage of the catalyst particle 22 downward through the chamber 30A. The hydraulic or pneumatic cylinder or electric actuator 30C then operates causing its plunger to force the catalyst particle 22 downward into the area 14D between the feet of the adjacent corrugations 14. At this time, the plunger also blocks entry of further catalyst particles 22 into the chamber. This blockage can also be accomplished by a clamp bar or similar type of assembly that is brought into the path of the further catalyst particles in conjunction with the plunger being moved downward. The hydraulic or pneumatic cylinder or electric actuator cylinder 30C then completes its stroke forcing the catalyst particle 22 to be held between the corrugations.

Once this operation completes, the hydraulic or pneumatic cylinder or electric actuator 30C retracts the plunger and the spring loaded ball assembly 30B returns to its original position. This allows the next catalyst particle 22 from the feed chamber 28A to be delivered to and held in the chamber 30A of the deposition mechanism 30 for subsequent supply to the current collector 14.

Whether a particular deposition mechanism 30 in the deposition assembly is actuated is determined by an actuating assembly in the form of a programmed controller 38. The controller also controls the operation of the other components of the system 24 including the X-Y table or support 51.

Indexing of the table 51 under the control of the programmed controller 38 successively brings each of the rows 36 of corrugations 14A into line with the row of deposition mechanisms 30 which in the present case remain stationary. A sensor 40 acts as to indicate to the programmed controller 38 that a row 36 of corrugations 32 (see, FIG. 4) has now been brought into line with the row of mechanisms 30 of the deposition assembly 29. A simple counting mechanism in the controller, counts the rows, so that the programmed controller can identify a particular row. The controller 38 then based on a predetermined stored catalyst pattern which correlates row numbers and associated areas 14D to receive catalyst particles 22, actuates the particular depositions mechanisms 30 associated with the catalyst receiving areas. This results in deposition of catalyst particles 22 by the mechanisms 30 in the particular row in accordance with the predetermined pattern.

Continued indexing of the table 51 in the Y direction and actuation of the deposition mechanisms 30 by the controller 38 thus results in the deposition of the catalysts particles 22 into all the rows of the corrugations of the collector 14 in accordance with the predetermined catalyst pattern. It is to be understood that the controller 38 can be programmed to obtain any desired predetermined pattern or to change the predetermined pattern for the catalyst deposition. Accordingly, the deposition of catalyst particles in the current collector 14 can be made so as to achieve a predetermined pattern for heat management throughout the fuel cell stack to realize a maximum energy yield.

With continued reference to FIGS. 2-3, there is also provided in the system 24, a fixing agent 42 for retaining the placement of each of the catalyst particles 22 within their respective areas 14D of the corrugations 14A. The fixing agent 42 is carried on a supply roller 61 and is, optionally, in the form of a dual-sided medium comprising double sided acrylic tape. The tape comprises an exposed adhesive side 43 and a covered adhesive side 45 protected by a backing 47 (see, FIG. 5).

In use, once the catalyst particles 22 are in position, application of the tape 42 on the supply roller 61 occurs by use of the press roller 62 which guides and presses the tape 42 on the catalyst members 22 and corrugations 14A in a manner well understood by one of ordinary skill in the art. Such application enables sealing of the catalyst particles 22 against the respective legs of the corrugations 14A of the collector 14. This occurs, as will be understood by one of ordinary skill in the art, since the side 43 is urged against the catalyst particles and corrugations 14A by the press roller 62 while the side 47 is free from contact therewith.

Figure 4:
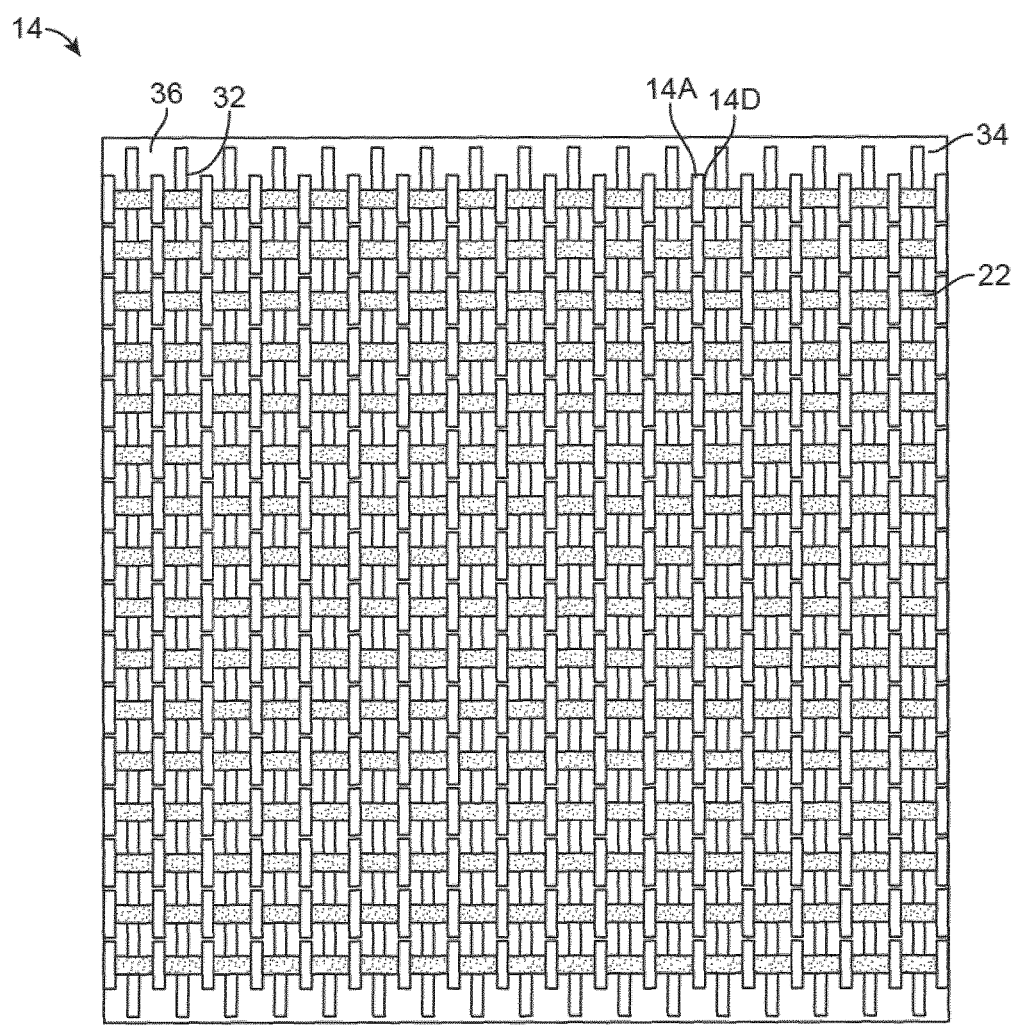
FIG. 4 shows final placement of the catalyst members in a chosen pattern relative to the current collector.
Figure 4A:
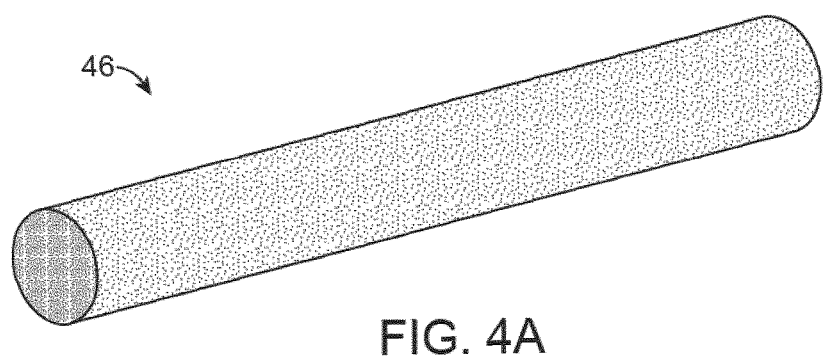
FIG. 4A shows the second catalyst member as shown in FIG. 1A.

As shown in FIG. 3 by the cutout portion thereof, the resultant placement of the catalyst particles 22 is retained, as is represented by FIG. 4. It is to be understood that the fixing agent of the present invention may also be arranged for use with an alternatively shaped catalyst member 46, optionally provided as an extruded material dimensioned substantially cylindrically, as shown in FIG. 4A. With the option of using an alternative member 46 such as that shown and corresponding to member 23 of FIG. 1A, any one such member 46 may be provided in a dimension extending substantially the length of the collector plate 14.

With reference to FIGS. 5-6, the process of assembling the fuel cell assembly 10 using the fixing agent 42 is described. Once application of the adhesive side 43 of the tape 42 occurs such that the uncovered adhesive attaches atop the catalyst particles 22 and portions of the collector plate 14, the backing 47 covering the opposed side 45 of the tape 42 is available for removal therefrom. This removal is shown as indicated by arrow "A" in FIG. 5.

Referring to FIGS. 6, 1 and 1A, there is shown, diagrammatically, the assembly shown in FIGS. 1 and 1A. Such assembly comprises the use of the fixing agent 42 not only in retention of the catalyst particles 22 to the collector plate 14, but also in retention of the electrodes 12 and 18 and their associated collector plates 14 and 20 to the bipolar separator plate 16. As such, it may be seen that the anode electrode 12 is assembled to its respective current collector plate 14 by strips of the tape 42 described hereinabove and situated on the top side of the plate. The underside 48 of the collector plate 14 housing the catalyst members 22 is covered with the exposed adhesive side 43 of the tape 42. The backing 47, as shown in FIG. 5, is then removed to enable adherence to, and thus construction with, the bipolar separator plate 16. Accordingly, the anode half of the fuel cell assembly 10 is then achieved.

Construction of the cathode half of the fuel cell assembly 10 begins by attaching the underside 54 of the cathode current collector 20 to the underside 56 of the bipolar separator plate 16 via the tape strips 42 on the underside of the bipolar plate after removal of the backing 47 of these strips exposing the adhesive layer 43. Thereafter, with the exposed adhesive side 43 of the tape 42 covering the surface 58 of the cathode current collector 20, the backing 47 thereof is ready to be removed. Once removed, the cathode electrode 18 may be adhered thereto to complete assembly of the cathode half of the fuel cell assembly 10.

Figure 7:
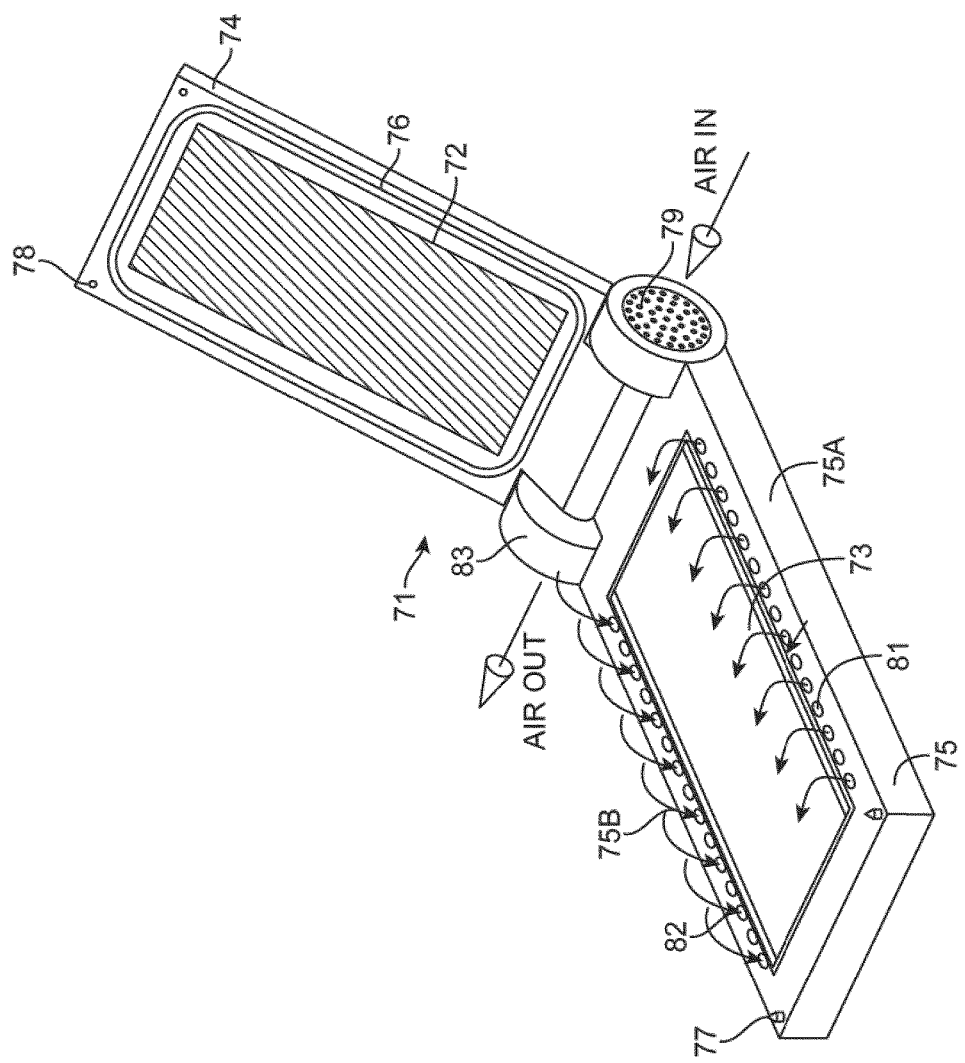
FIG. 7 shows a vacuum press unit for compressing under heat the fuel cell assembly of FIG. 6.
Figure 8:
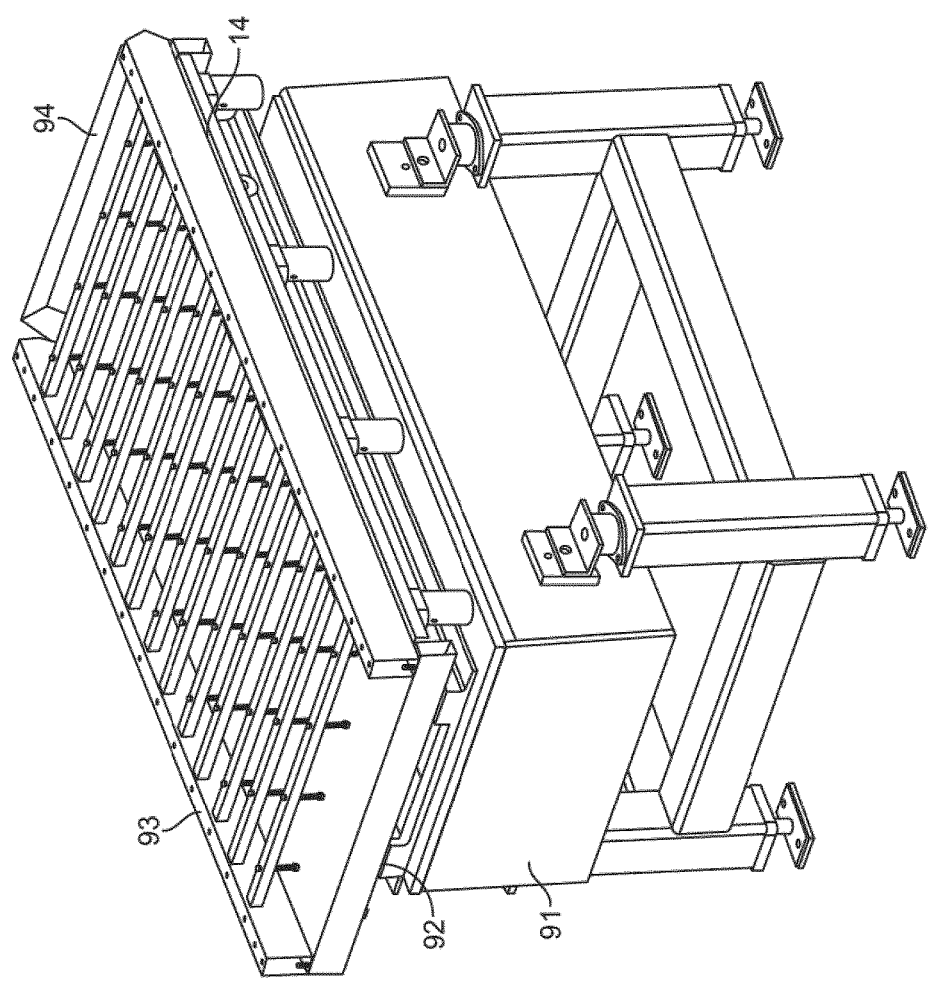
FIG. 8 shows a further system for the placement of catalyst particles in the form of pellets onto a current collector.

In order to ensure that the components of the assembly 10 remain in tact, the assembly 10 can be subjected to pressure and heat in order to enhance the retention power of the tape 42. FIG. 7 shows a vacuum press unit 71 which can be used of this purpose. The unit 71 includes upper and lower platens 72 and 73 supported, respectively, on a top cover 74 pivotably attached to a base assembly 75. The top cover 74 carries a vacuum sealing gasket 76 which borders the periphery of the upper platen 72. When the cover 74 is lowered by pivoting, the upper and lower platens 72 and 73 are brought together by locating pins 77 on the base assembly 75 and corresponding locating holes 78 in the cover to form a sealed vacuum chamber for receiving the assembled fuel cell assembly 10.

A heated air inflow unit 79 is then turned on to draw-in outside air and to heat the air. The heated air is then delivered to the sealed vacuum chamber through a plenum along the side 75A of the base assembly. Air delivery ports 81 convey the heated air from the plenum to the sealed vacuum chamber between the platens when the platens are brought together with the assembly 10 secured between them.

The heated air heats the assembly 10 and passes from the vacuum chamber via air exit ports 82 on the other side 75B of the base assembly 75 to a plenum on this side of the assembly. After assembly 10 reaches a desired temperature, the heated air unit 79 closes or shuts off and a blower or fan 83 is turned on. This allows the blower or fan 83 to draw vacuum from the base assembly 75 with the assembly 10 in it via the air exit ports 82 and the plenum on the side 75B of the base assembly 75. As a result, a thermo-vacuum pressing of the assembly 10 is carried out. After a predetermined time, the pressing of the assembly 10 is complete and the fan 83 is turned off. The platens 72 and 73 are then separated by pivoting the top cover 74 upward, thereby allowing removal of the assembly 10.

FIGS. 8-11 show a further assembly for deposition of the catalyst particles into preselected of the areas 14D of the current collector 14. As shown the system comprises a mass block or base member 91 which supports a vibratory block 92. A mask gate assembly 93 is supported by the vibratory block 92 against the anode current collector 14 which is to be loaded with catalyst particles. A hopper 94 holds catalyst particles in the form of pellets and these are fed to the mask gate assembly 93.

Figure 9:
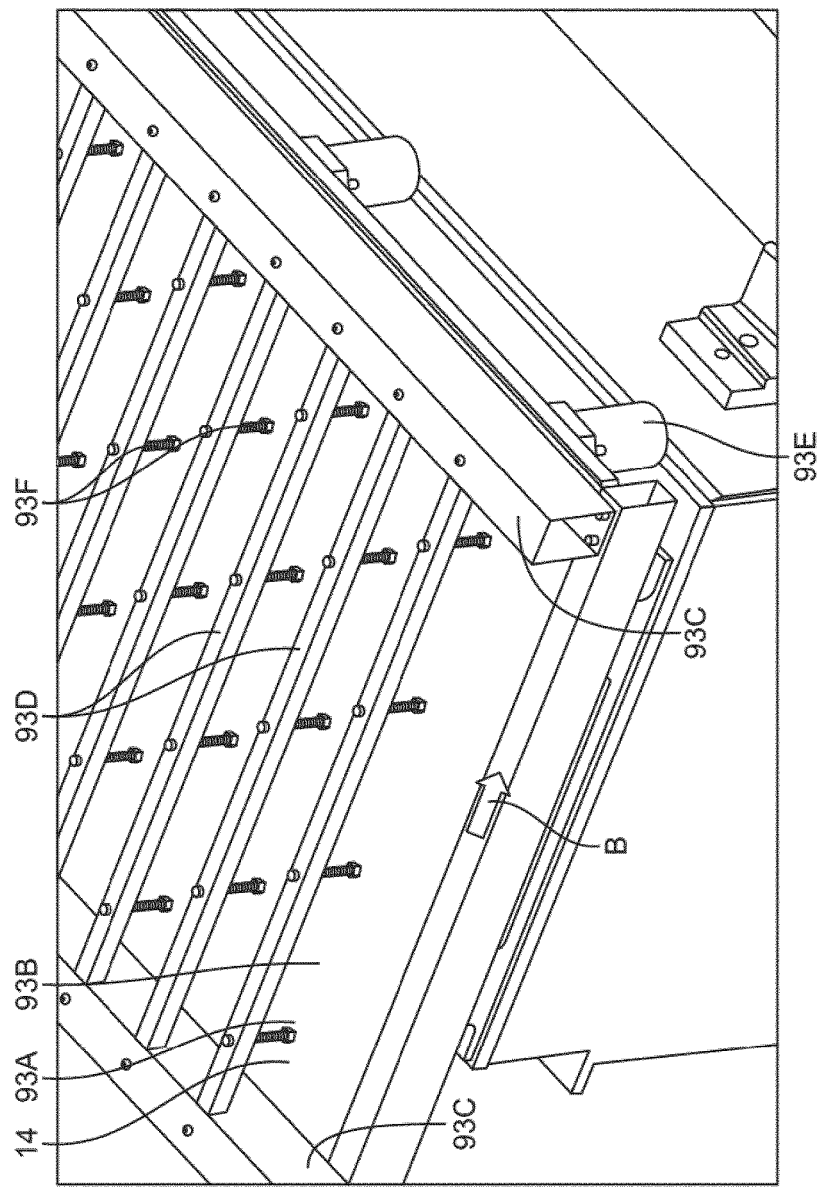
FIG. 9 shows the mask gate assembly of the system of FIG. 8.
Figure 10:
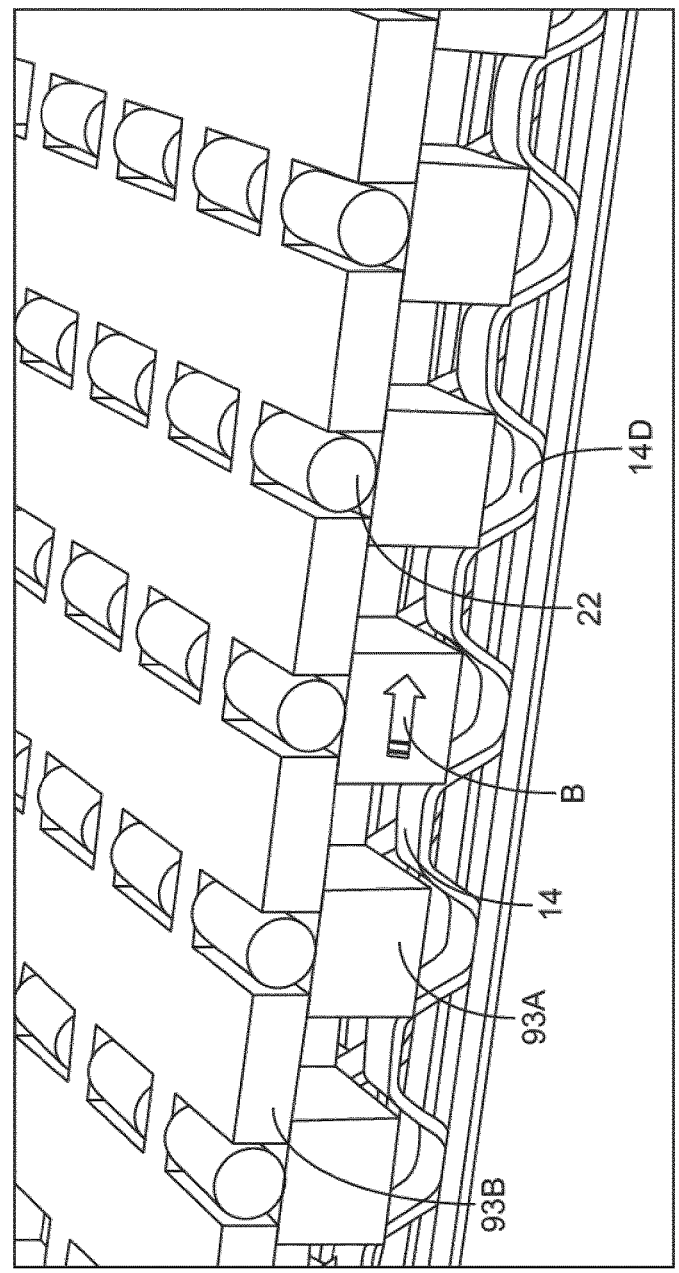
FIGS. 10 and 11 show an exploded view of a portion of the mask gate assembly of FIG. 9 with the mask gate closed and opened, respectively
Figure 11:
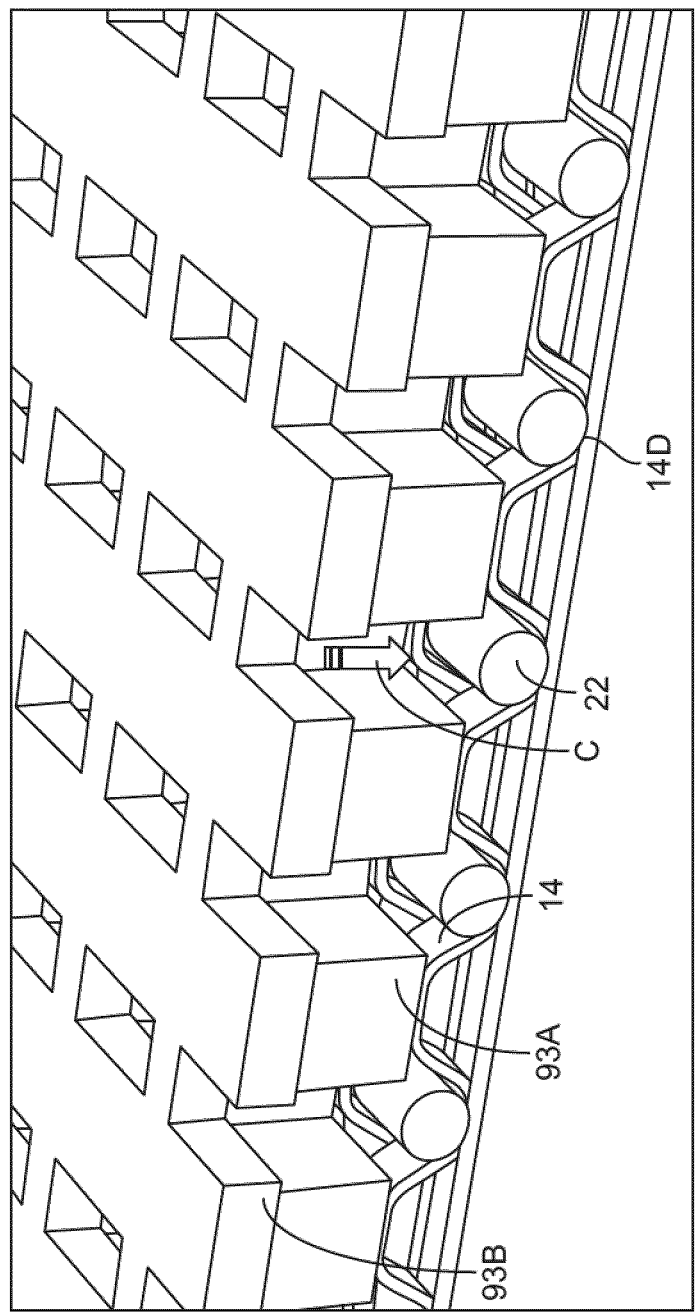

The mask gate assembly is shown in more detail in FIGS. 9-11 and comprises clamp bars 93C, 93D and pneumatic clamps 93E which clamp overlying gate and mask plates 93A and 93B together and to the vibratory block over the current collector 14. As shown, the mask plate 93B lies above the gate plate 93A and the gate plate 93A faces the current collector. Spring loaded pins 93F provide a downward force across the surface of the mask plate 93B, while still permitting catalyst pellets to have access to the openings in the mask plate as discussed further hereinbelow. The clamping of the plates is such that the gate plate 93A can be shifted or translated laterally (in the direction of the arrow B) relative to the mask plate 93B via a mechanical force applied by an operator either directly or via an actuator.

The mask plate 93B has through openings equal in number and positioned to coincide with the pre-selected areas 14D between the legs or feet of adjacent corrugations of the collector which are to receive catalyst pellets in accordance with the desired pattern. The gate plate 93A, in turn, also has through openings. These openings, however, are equal in number and positioned to coincide with all the areas 14D of the collector.

As shown in FIG. 10, the mask gate assembly 93 is clamped to the vibratory block 92 over the current collector so that the through openings in the gate plate 93A are misaligned with the areas 14D of the current collector while the through openings of the mask plate 93B are aligned with these openings. Solid areas of the gate plate 93A thus block movement from the through openings of the mask plate 93B to the areas 14D of the current collector. In this closed position of the gate assembly 93, vibration is used to move catalyst pellets from the hopper 94 so that they distribute along the length of the mask plate 93B and deposit in the through openings of the mask plate.

The mask plate 93B is designed such that only one catalyst pellet can reside in each of its openings. The catalyst pellets also cannot sit on top of one another due to the mask plate thickness being less than the pellet diameter. This creates channels for the catalyst pellets to travel along until they reach an empty opening in the mask plate. Once the openings in the mask plate 93B are all filled, the gate plate 93A is shifted laterally as shown by the arrow B in FIG. 10 to bring the mask gate assembly 93 to its open position as shown in FIG. 11.

In this position, due to the shifting of the gate plate 93A, the through openings in the gate plate now align with the areas 14D of the current collector and also with the through openings in the mask plate 93B. The catalyst pellets thus fall in the direction of the arrow C from the openings in the mask plate 93B through the corresponding openings in the gate plate 93A into the underlying areas 14D of the current collector. The current collector 14 thus becomes loaded with catalyst pellets in accordance with the desired predetermined pattern.

Moreover, the vibratory motion imparted to the current collector by the block 92 causes the catalyst pellets to orient themselves in the areas or pockets 14D of the current collector in such a way as to not protrude above the height of the legs defining the areas. This allows for further processing of the catalyst loaded current collector as by application of an adhesive fixing agent to hold the catalyst pellets in the current collector as discussed above.

To aid in securing the catalyst pellets in the areas 14D of the current collector, the vibratory block 92 is adapted to be subjected to a vacuum which secures the current collector to the block via an adhesive membrane on the current collector. This provides an intimate contact between the collector and a very smooth, even transmission of vibration. As a result, the catalyst pellets are moved into and settle into the areas 14D so as to not protrude from the current collector as above-described.

In all cases it is to be understood that the above-described subject matter is merely illustrative of the many possible specific embodiments, which represent applications of the present invention. Numerous and varied other arrangements can be readily devised in accordance with the principles of the present invention, without departing from the spirit and scope of the invention. In particular, while the invention has been illustrated in terms of loading an anode current collector with catalyst particles, it is evident that the principles of the invention extend to loading of other fuel cell components defining or forming the anode flow field or fuel flow field of a fuel cell. Loading of a bipolar separator plate with catalyst particles might be one example.

What is claimed is:

1. A method of fabricating a fuel cell component for use with or as part of a fuel cell in a fuel cell stack, the method comprising:
    providing a fuel cell component;
    providing a deposition assembly for depositing loading material particles onto the fuel cell component;
    locating the fuel cell component relative to the deposition mechanism;
    actuating the deposition assembly to cause said deposition assembly to deposit said loading material particles onto said fuel cell component; and
    applying an adhesive tape to the fuel cell component to maintain positioning of the loading material particles relative to the fuel cell component.

2. The method in accordance with claim 1, further comprising:
    sensing the locating of said fuel cell component; and
    wherein said actuating is responsive to said sensing.

3. The method in accordance with claim 1, wherein:
    said loading material particles comprise catalyst particles.

4. The method in accordance with claim 1, wherein:
    said adhesive tape is a double-sided adhesive tape.

5. The method in accordance with claim 4, further comprising:
    joining another fuel cell component to said fuel cell component via said double-sided adhesive tape.

6. The method in accordance with claim 5, further comprising;
    applying additional double-sided adhesive tape to said fuel cell component and applying double-sided adhesive tape to said another fuel cell component and one or more of additional fuel cell components and joining said fuel cell component, said another fuel cell component and said additional fuel components together via said double-sided adhesive tape.

7. The method in accordance with claim 6, wherein:
    said fuel cell component is an anode current collector, said another component is a separator plate and said additional components are an anode, a cathode current collector and a cathode.

8. The method in accordance with claim 6, further comprising:
    applying heat and pressure to said fuel cell components and said double-sided adhesive tape to facilitate said double-sided adhesive tape holding said fuel cell components together.

9. The method in accordance with claim 1, further comprising:
    applying a fixing agent relative to the fuel cell component and to the loading material to maintain positioning of the loading material relative to the fuel cell component.

10. The method in accordance with claim 1, wherein:
    said loading material particle comprise catalyst particles.

11. The method in accordance with claim 1, wherein
    the fuel cell component comprises a plurality of rows, each row including areas for receiving loading material particles; and
    the deposition assembly includes a plurality of deposition mechanisms, each deposition mechanism associated with an area of the areas in a row; and
    each deposition mechanism is actuated according to a pre-defined deposition pattern.

12. The method in accordance with claim 11, wherein:
    the pre-defined deposition pattern is associated with a desired heating profile of the fuel cell stack.

13. The method of claim 11, wherein
    each deposition mechanism includes one of: aligned openings in overlying first and second plates, said first plate overlying said second plate and having openings corresponding to said pre-defined deposition pattern and said second plate having openings corresponding to all the areas of said fuel cell component; and a chamber, a hydraulic or pneumatic cylinder or electric actuator with a plunger, and a gate assembly for selectively allowing passage into said chamber.

14. The method of claim 1, wherein:
    said fuel cell component is one or more of an anode current collector, a component used in forming the fuel flow field of a fuel cell and a component used in forming the anode flow field of a fuel cell.

* * * * *